(12) United States Patent
Kanamaru

(10) Patent No.: US 6,626,144 B1
(45) Date of Patent: Sep. 30, 2003

(54) CONTROL DEVICE FOR INTERNAL COMBUSTION ENGINE

(75) Inventor: Masanobu Kanamaru, Misima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/088,508
(22) PCT Filed: Sep. 27, 2000
(86) PCT No.: PCT/JP00/06677
§ 371 (c)(1), (2), (4) Date: Mar. 28, 2002
(87) PCT Pub. No.: WO01/23726
PCT Pub. Date: Apr. 5, 2001

(30) Foreign Application Priority Data

Sep. 28, 1999 (JP) ............................................. 11-274721

(51) Int. Cl.$^7$ ................................................. F02D 7/60
(52) U.S. Cl. ................. 123/399; 123/406.52; 123/90.15
(58) Field of Search ............................ 123/399, 406.52, 123/90.15

(56) References Cited

U.S. PATENT DOCUMENTS 5,069,184 A * 12/1991 Kato et al. ............. 123/406.52
5,690,071 A * 11/1997 Jankovic ..................... 123/436
6,488,008 B1 * 12/2002 Jankovic et al. ............ 123/399

FOREIGN PATENT DOCUMENTS

| JP | 10-47118 | 2/1998 |
|----|----------|--------|
| JP | 10089140 | 4/1998 |
| JP | 10169469 | 6/1998 |
| JP | 10-339205 | 12/1998 |
| JP | 11-62660 | 3/1999 |
| JP | 11-229951 | 8/1999 |

* cited by examiner

*Primary Examiner*—Erick Solis
(74) *Attorney, Agent, or Firm*—Oblon, Spivak, McClelland, Maier & Neustadt, P.C.

(57) ABSTRACT

An electronic control unit 10 of an internal combustion engine sets a target throttle valve opening degree based on the amount of accelerator pedal operation, and starts driving an electronically controlled throttle valve 16 after a predetermined delay time has passed in order to precisely estimate the actual throttle valve opening degree when the intake valve of the cylinder is closed and to estimate the amount of the intake air filled in the cylinder. In an engine equipped with a variable valve timing mechanism 50, the ECU 10 estimates the target throttle valve opening degree of when the intake valve closes, estimates the actual valve timing when the intake valve closes based on the estimated target opening degree, and estimates the amount of the air filled in the cylinder when the intake valve of the cylinder closes based on the estimated throttle valve opening degree and on the estimated valve timing. The amount of the air taken in is thus precisely estimated even in a variable valve timing engine.

7 Claims, 5 Drawing Sheets

Fig.2
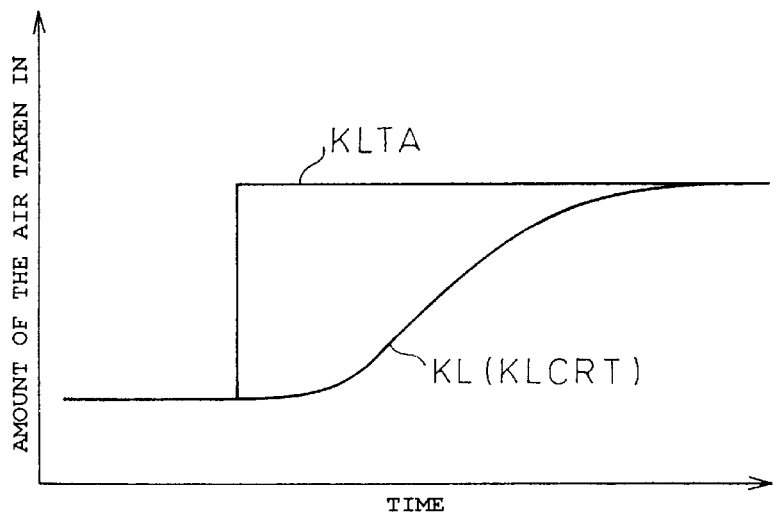
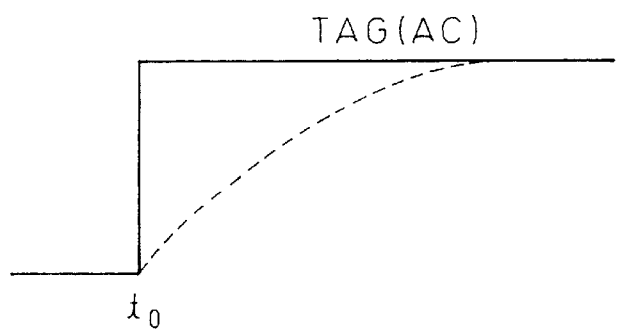
Fig.3(A)
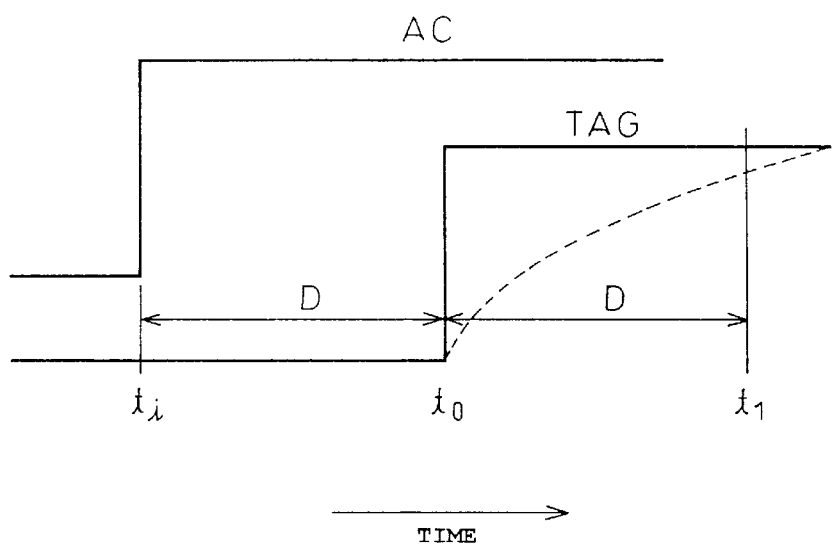
Fig.3(B)

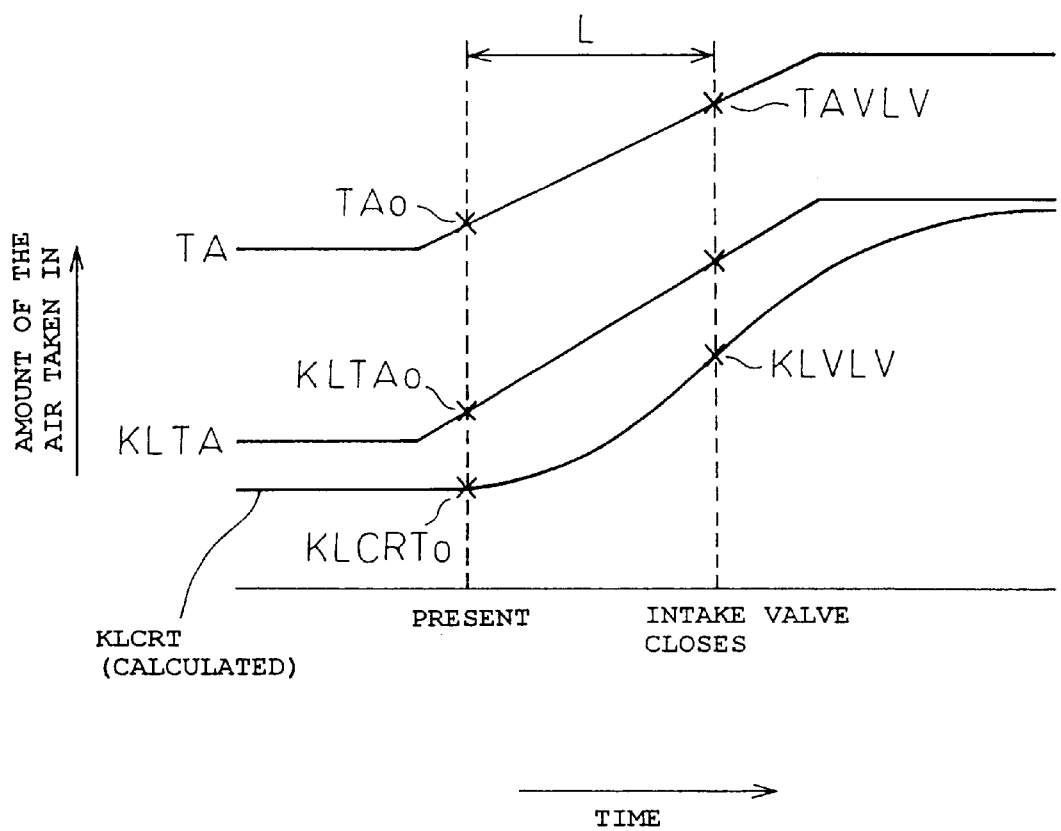

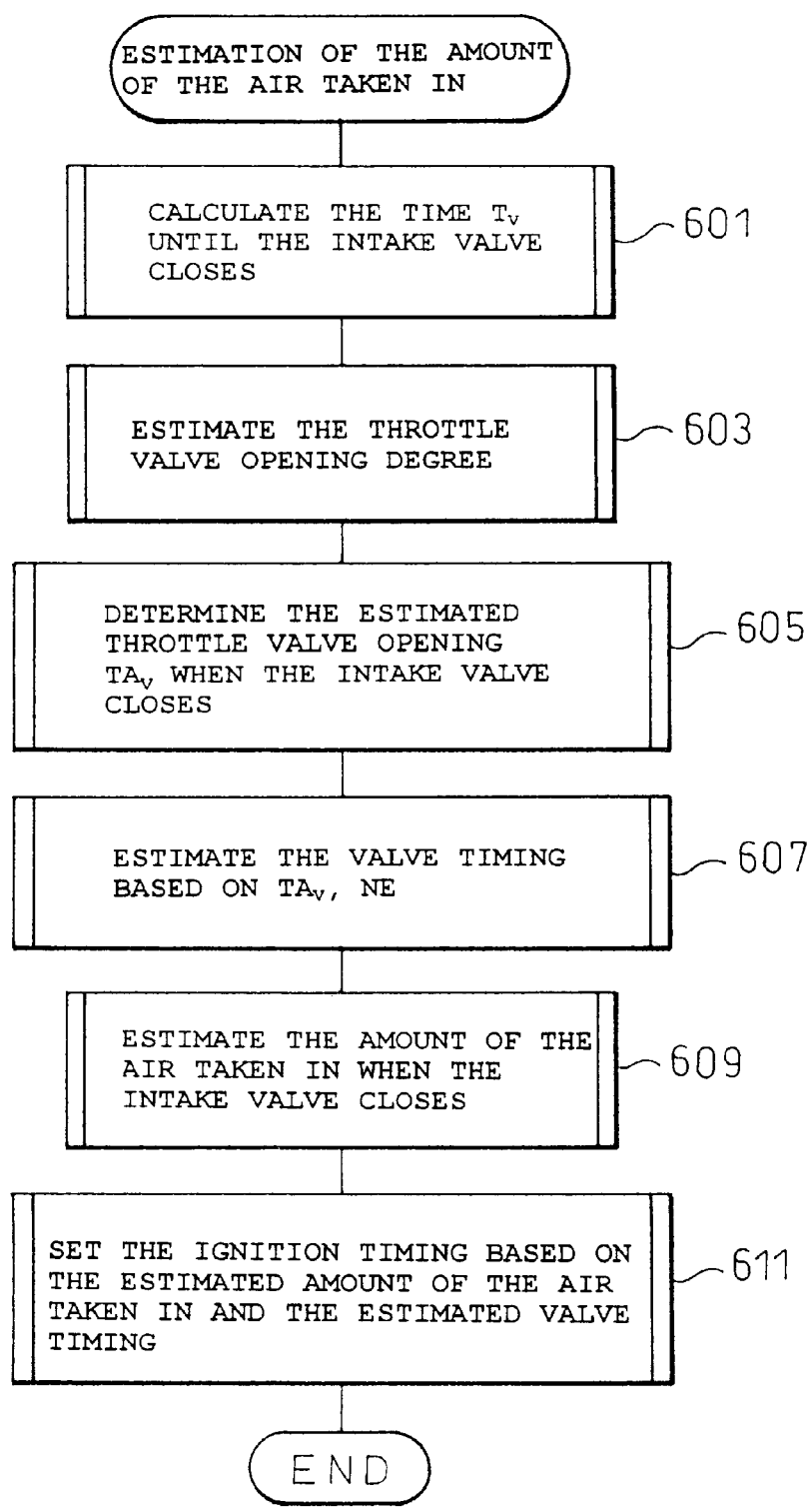

CONTROL DEVICE FOR INTERNAL COMBUSTION ENGINE

TECHNICAL FIELD

The present invention relates to a device for controlling an internal combustion engine. More specifically, the invention relates to a device for controlling an internal combustion engine which estimates a future value of a degree of opening of the engine throttle valve after a predetermined time lapses by delaying the start of operation for controlling a degree of opening of the engine throttle valve to a target value and, based on this estimated value of the degree of opening of the throttle valve, precisely estimating the amount of the intake air taken into the engine in the future.

BACKGROUND ART

There has been known a device for controlling an internal combustion engine including a so-called electronically controlled throttle valve of which the opening degree can be controlled independently of the amount of accelerator pedal operation by the driver and precisely estimating the amount of the air that will be taken in by the engine by delaying the start of the operation for controlling the throttle valve opening degree to a target value determined from the amount of accelerator pedal operation by a predetermined delay time.

In general, there has been employed a so-called air amount-based fuel amount control system in which the amount of the air taken in by the internal combustion engine is first measured, and the amount of fuel injection is controlled based on the measured air amount so that the engine air-fuel ratio becomes an optimum value. In such an engine, it is important to precisely measure the amount of the air taken in by the engine. In a state where the amount of the air taken in by the engine is varying due to changes in the throttle valve opening degree and in the rotational speed as a result of transient operation condition, however, it often becomes difficult to precisely measure the amount of the air taken in by the engine. The amount of the air actually taken in by the cylinders of the engine is determined at the time when the intake valves of the respective cylinders close. In order to precisely set the amount of fuel injection, therefore, the amount of fuel injection must be set based upon the amount of the air taken in by the engine at a moment when the intake valve of the cylinder closes. Generally, however, the timing for calculating the amount of fuel injection for each cylinder precedes the timing at which the intake valve closes. In order to precisely set the amount of fuel injection based on the amount of the air actually taken in by the cylinder, therefore, it is necessary to precisely estimate the amount of the air taken in by the engine at a moment when the intake valve will be closed in the future at a moment of calculating the amount of fuel injection.

The amount of the air taken in by the engine varies depending upon the throttle valve opening degree and the rotational speed of the engine. Since the rate of change in the throttle valve opening degree is relatively larger than a rate of change in the engine rotational speed during the transient operation, if the throttle valve opening degree at the time when the intake valve is closed could be precisely estimated, then, the amount of the air taken in by the engine at the time when the intake valve is closed can be estimated. In an engine equipped with an electronically controlled throttle valve which can be operated independently of the acceleration pedal operation by the driver, there has been proposed a so-called phase-advanced inverse calculation method in which the future throttle valve opening degree is precisely estimated by delaying the operation of opening or closing of the throttle valve by a predetermined period of time and the amount of the air that will be taken in by the engine in the future (amount of the air taken in by the engine when the intake valve closes in the cylinder) is precisely estimated based on the estimated throttle valve opening degree.

A device for controlling an internal combustion engine by estimating the intake air amount of this kind has been disclosed in, for example, Japanese Unexamined Patent Publication (Kokai) No. 10-169469.

According to the device of this publication, the target opening degree of the electronically controlled throttle valve is set based upon the present amount of accelerator pedal operation (amount of depression). However, the throttle valve is not driven to a target opening degree immediately after the target opening degree is set. Instead, the throttle valve is driven after a predetermined delaying time elapses. In general, the electronically controlled throttle valve involves a lag in operation due to the delay in the control operation or due to the delay in the activation of the mechanism. Even when the target opening degree has rapidly (e.g., stepwise) changed, therefore, there occurs a delaying time determined from the operation characteristics of the throttle valve until the throttle valve opening degree actually arrives at the target opening degree. Therefore, if the operating characteristics of the throttle valve are precisely known, it becomes possible to calculate the throttle valve opening degree at each moment until the throttle valve actually arrives at a target opening degree even when the target opening degree of the throttle valve varies stepwise. In theory, it is possible to estimate the throttle valve opening degree at each moment based on the operating characteristics of the throttle valve at a moment when the target opening degree has changed stepwise.

In actual operation, however, when the accelerator pedal is moved a large amount by the driver and the target opening degree changes continuously, a change in the target opening degree after the, moment of estimation is not reflected on the estimated value even when the future throttle valve opening degree is estimated at each moment based on the throttle valve operation characteristics at a given moment. Therefore, the estimated throttle valve opening degree loses precision.

According to the device of the above publication, after the target opening degree has been set, the start of the operation for driving the throttle valve depending upon the target opening degree is delayed by a predetermined delay time (a period of the delay time is so short that the driver does not actually feel the delay), so that a change in the target opening degree is completely reflected on the estimated throttle valve opening degree. Namely, in the device of the above publication, the actual operation of the throttle valve is delayed by the above delay time to after the change in the target opening degree. This, in other words, makes it possible to know exactly, at a moment when the throttle valve actually starts operating, how the target throttle valve opening degree will change thereafter. It is, therefore, made possible to completely reflect a change in the target opening degree on the estimated throttle valve opening degree and, hence, to precisely estimate an actual change in the throttle valve opening degree. According to the device of the above publication, the throttle valve opening degree at a moment when the intake valve closes is precisely estimated at a moment when the amount of fuel injection is calculated, and the amount of the air taken in by the engine at a moment when the intake valve closes is calculated based on this estimated throttle valve opening degree.

When applied to a fixed-valve-timing engine in which the intake and exhaust valves have fixed opening/closing timings, the device of the above publication makes it possible to precisely estimate the amount of the air taken in by the engine. However, when applied to a variable-valve-timing engine in which the timings for opening and closing the intake and exhaust valves are varied depending upon the engine operating conditions, the device of the above publication is not capable of precisely estimating the amount of the air taken in by the engine.

In the variable-valve-timing engine, the target valve timing is set depending upon the engine load (amount of the air taken in by the engine and the rotational speed). However, the amount of the air taken in by the engine is not exclusively determined by the throttle valve opening degree and the rotational speed, but varies in accordance with a change in the valve timing. Therefore, if the amount of the air taken in by the engine is estimated relying on the estimated throttle valve opening degree only as is done by the device of the above-mentioned Japanese Unexamined Patent Publication (Kokai) No. 10-169469, the accuracy of the estimation of the amount of the air taken in by the engine greatly drops when the valve timing changes.

In this case, the operating speed of the variable-valve-timing mechanism is usually considerably slower than the operating speed of the electronically controlled throttle valve. When the throttle valve opening degree changes rapidly, therefore, a change in the engine valve timing when the throttle valve opening degree is changing is negligibly small, and the precision for estimating the amount of the air taken in by the engine is not much affected. At the time of slow acceleration or slow deceleration in which the change in the throttle valve opening degree is relatively small, however, a change in the valve timing during the throttle valve opening degree is changing becomes relatively large, and the precision for estimating the amount of the air taken in greatly decreases.

In the device of the above-mentioned publication, further, the delay from when the target opening degree changes to when the throttle valve operates correspondingly is kept constant. Therefore, the timing for starting the operation of the throttle valve as viewed from the stroke cycle of each cylinder varies depending upon the timing of change in the target opening degree. In an actual internal combustion engine, the amount of the air actually taken in by the cylinder varies to some extent depending upon at which portion of the stroke cycle of the cylinder the amount of the air taken in by the engine has changed (i.e., at which portion the throttle valve opening degree has changed). Therefore, when the throttle valve opening degree starts changing on the stroke cycle of the cylinder as is done in the device of the above publication, the amount of the air actually taken in by the cylinder often changes even though the amount of the air taken in by the engine remains the same when the intake of the cylinder valve closes. This causes a decrease in the precision of estimating the amount of the air taken in by the cylinder.

DISCLOSURE OF THE INVENTION

It is an object of the present invention to provide a device for controlling an internal combustion engine which makes it possible to precisely calculate the amount of the air taken in by the cylinder by solving the above-mentioned problems.

According to the present invention, there is provided a device for controlling an internal combustion engine which sets a target throttle valve opening degree of the internal combustion engine based on a present amount of accelerator pedal operation and, after a predetermined delay time has passed, starts driving the throttle valve so that the actual throttle valve opening degree becomes said target opening degree, thereby to estimate the actual throttle valve opening degree in the future after a predetermined period of time has passed from the present based on said target opening degree, said delay time and the operation characteristics of the throttle valve, and to calculate the amount of the air that will be taken in by the engine in the future after said predetermined period of time has passed based upon said estimated value, said device for controlling an internal combustion engine comprising:

target valve timing-setting means for setting a target valve timing of the engine based on an actual throttle valve opening degree;

variable valve timing means for controlling the valve timing of the engine to said target valve timing valve timing-estimating means for calculating an estimated value of said target valve timing in the future, after said predetermined period of time has passed, based on said estimated throttle valve opening degree, and for estimating an actual engine valve timing in the future after the passage of said predetermined period of time based on said estimated target valve timing; and intake air amount-estimating means for estimating the amount of the air that will be taken in by the engine in the future after said predetermined period of time has passed based on said estimated throttle valve opening degree and said estimated valve timing.

That is, the present invention estimates not only the throttle valve opening degree but also the engine valve timing at the same time at a moment in the future.

A target value of the engine valve timing is, usually, set based on the amount of the air actually taken in by the engine and the engine rotational speed. As explained before, however, the amount of the air taken in by the engine also varies depending upon the valve timing. It is, therefore, difficult to precisely estimate both the amount of the air taken in by the engine and the valve timing. In the present invention, the target valve timing is determined based, for example, upon the throttle valve opening degree without using the amount of the air taken in by the engine that varies due to the valve timing. It is therefore made possible to estimate a target valve timing at a moment in the future by using the estimated throttle valve opening degree. If the target valve timing could be measured at a moment in the future, the actual valve timing at a moment in the future can be estimated based on the operation characteristics of the variable valve timing means by using the same method as the one used for estimating the actual throttle valve opening degree. According to the present invention, therefore, it is possible to estimate the throttle valve opening degree as well as the valve timing at a moment in the future (e.g., at a moment when the intake valve of the cylinder closes), and the amount of the air taken in by the engine is precisely calculated reflecting a change in the valve timing.

According to another aspect of the present invention, there is provided a device for controlling an internal combustion engine which sets a target throttle valve opening degree of the internal combustion engine based on a present amount of accelerator pedal operation and, after a predetermined delay time has passed, starts driving the throttle valve so that the actual throttle valve opening degree becomes said target opening degree, thereby to estimate the actual throttle valve opening degree in the future after a predetermined period of time has passed from the present based on said target opening degree, said delay time and the operation characteristics of the throttle valve, and to calculate the amount of the air that will be taken in by the engine in the future after said predetermined period of time has passed based upon said estimated value, said device for controlling an internal combustion engine comprising:

delay time-setting means for so setting said delay time that said throttle valve starts driving at a predetermined timing in a stroke of a particular cylinder of the engine.

That is, according to this aspect of the invention, the delay time is so set that the throttle valve is driven so as to be adjusted to the target throttle valve opening degree at a predetermined timing in a stroke of a particular cylinder (e.g., first cylinder). Therefore, the throttle valve starts operating whenever the engine cranks haft arrives at a predetermined rotational angular position. In the actual, internal combustion engine as described earlier, the amount of the air actually taken in by the cylinder slightly differs depending on at what portion of the stroke cycle of the cylinder the amount of the air taken in by the engine has changed (i.e., at what portion the throttle valve opening degree has changed). Therefore, when the throttle valve opening degree starts changing on the stroke cycle of the cylinder, the amount of the air actually taken by the cylinder often changes even though the amount of the air taken in by the engine is the same at a moment when the intake valve of the cylinder closes, causing a decrease in the precision of estimating the amount of the air taken in by the cylinder. In the present invention, the throttle valve opening degree always starts changing at a predetermined crank angle. The air starts to be taken in by the engine always at the same position of the stroke cycle of each cylinder. Therefore, a dispersion in the amount of the air taken in, that is caused by a change in the position where the throttle valve opening degree starts changing, does not occur and, hence, the precision for estimating the amount of the air that is taken in is improved According to another aspect of the present invention, there is provided a device for controlling an internal combustion engine which sets a target throttle valve opening degree of the internal combustion engine based on a present amount of accelerator pedal operation, starts driving the throttle valve, after a predetermined delay time has passed, so that the actual throttle valve opening degree becomes said target opening degree, thereby to estimate the actual throttle valve opening degree in the future after a predetermined period of time has passed from the present based on said target opening degree, said delay time and the operation characteristics of the throttle valve and to calculate the amount of the air that will be taken in by the engine in the future after said predetermined period of time has passed based upon said estimated value, said device for controlling an internal combustion engine, comprising:

delay time-setting means for so setting said delay time that said throttle valve starts driving at a predetermined timing in a stroke of a particular cylinder of the engine when the engine is idling;

stall-avoiding means for avoiding an engine stall by setting a target throttle valve opening degree irrespective of the amount of accelerator pedal operation when it is probable that the engine that is idling may stall; and means for starting the driving of the throttle valve so that the throttle valve opening degree readily reaches said target opening degree when the target throttle valve opening degree is set by said stall-avoiding means to avoid an engine stall irrespective of the delay time set by said delay time-setting means.

According to this embodiment of the invention, the throttle valve is readily driven without setting a delay time when the throttle valve is driven (throttle valve opening degree is increased) to prevent the engine that is idling from stalling due to worsening of combustion or the like. When the rotational speed of the engine that is idling greatly drops due to worsening of combustion or the like, the throttle valve opening degree must be increased as quickly as possible to avoid an engine stall. In such a case, a lagging start of operation of the throttle valve may cause the engine to stall when the engine rotational speed greatly drops since a change in the throttle valve opening degree does not occur in time. According to the present invention, therefore, when the throttle valve opening degree is increased to prevent the engine that is idling from stalling, the throttle valve opening degree is readily increased without providing a delay time thereby to prevent an engine stall.

BRIEF DESCRIPTION OF DRAWINGS

FIGS. 2, 3(A), 3(B), 4 and 5 are diagrams illustrating a method of estimating the amount of the intake air by the control device; and FIG. 6 is a flowchart for concretely illustrating the operation for estimating the amount of the intake air by the control device of FIG. 1.

BEST MODE FOR CARRYING OUT THE INVENTION

Embodiments of the present invention will now be described with reference to the accompanying drawings.

Figure 1:
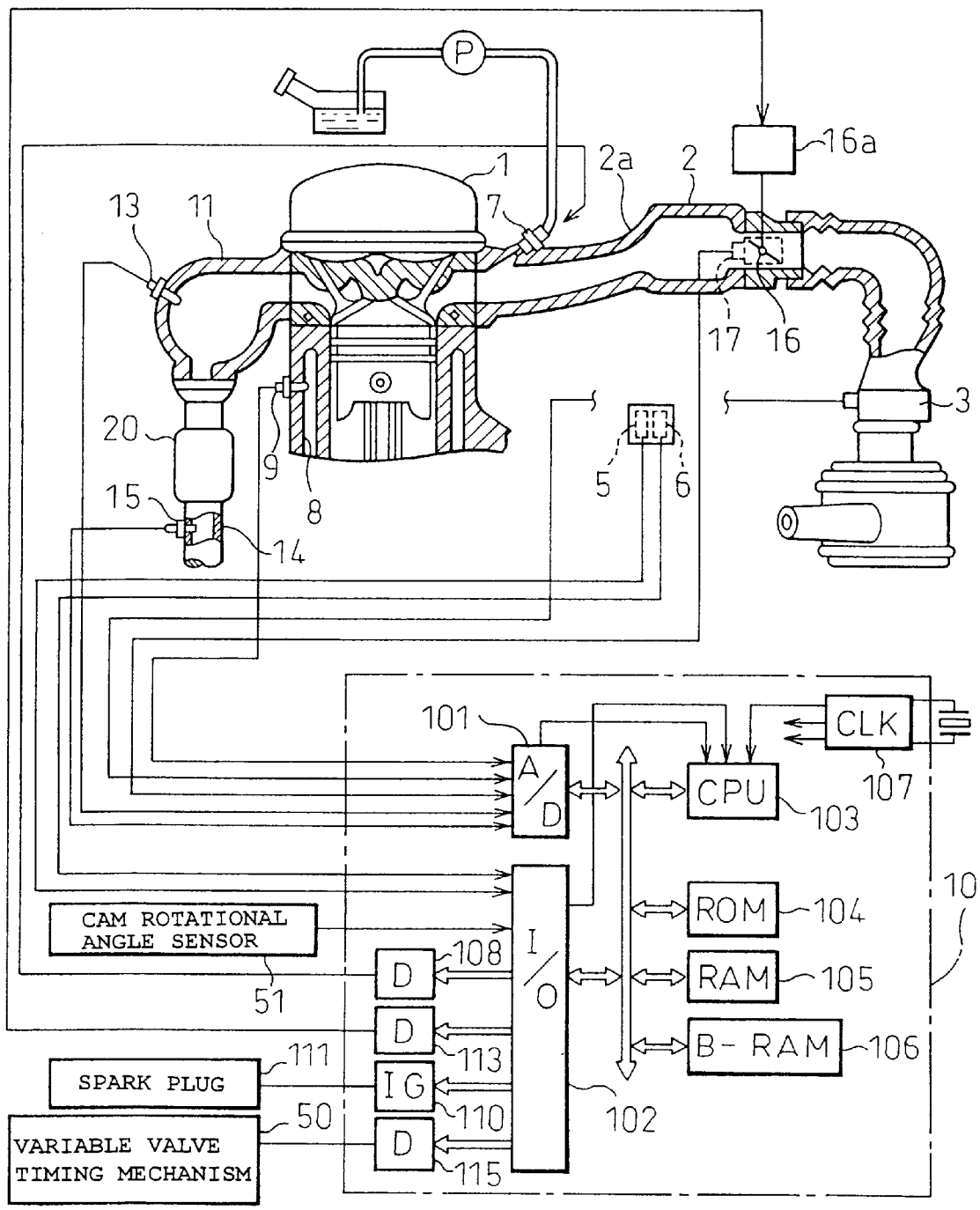
FIG. 1 is a diagram schematically illustrating the arrangement of the device for controlling an internal combustion engine of the present invention when it is applied to an internal combustion engine for automobiles.

FIG. 1 is a view schematically illustrating the whole constitution of the present invention applied to an internal combustion engine for automobiles. In FIG. 1, reference numeral 1 denotes a body of an internal combustion engine, 2 denotes a surge tank provided in the intake passage of the engine 1, reference numeral 2a denotes an intake manifold connecting the surge tank 2 to the intake ports of the cylinders, 16 denotes a throttle valve disposed in the intake passage upstream of the surge tank 2, and reference numeral 7 denotes a fuel injection valve for injecting the pressurized fuel to the intake port of each cylinder of the engine 1.

In this embodiment, the throttle valve 16 is provided with an actuator 16a such as a stepper motor. The throttle valve 16 is of the type that degree of opening thereof changes depending upon a control signal input from an ECU 10 that will be described later. That is, the throttle valve 16 of this embodiment is a so-called electronically controlled throttle valve that can be opened irrespective of the amount of the accelerator pedal operation by a driver. The throttle valve 16 is further provided with a throttle opening sensor 17 which generates a voltage signal in compliance with the amount of operation (opening degree) of the throttle valve.

In FIG. 1, reference numeral 11 denotes an exhaust manifold for connecting the exhaust ports of the cylinder to a common exhaust pipe 14, reference numeral 20 denotes a three-way catalyst disposed in the exhaust pipe 14, reference numeral 13 denotes an upstream air-fuel ratio sensor disposed in the exhaust manifold 11 at a portion where the exhaust gases merge together (upstream of the three-way catalyst 20), and 15 denotes a downstream air-fuel ratio sensor disposed in the exhaust pipe 14 downstream of the three-way catalyst 20. When the air-fuel ratio of the exhaust gas flowing in is near a stoichiometric air-fuel ratio, the three-way catalyst 20 is capable of purifying the three components, i.e., HC, CO and $NO_x$ in the exhaust gas simultaneously. The air-fuel ratio sensors 13 and 15 are used for detecting the exhaust gas air-fuel ratios when the amount of fuel injection into the engine is controlled by feedback, so that the engine air-fuel ratio becomes a predetermined target air-fuel ratio when the engine is in normal operation.

In this embodiment, the intake passage is provided at its inlet with an air flow meter 3 which generates a voltage signal corresponding to the amount of the air taken in by the engine, and a water jacket 8 of the cylinder block of the engine body 1 is provided with a water temperature sensor 9 that generates an analog voltage electric signal depending upon the temperature of the cooling water.

Output signals of the throttle valve opening sensor 17, air flow meter 3, water temperature sensor 9 and air-fuel ratio sensors 13 and 15, are input to a multiplexer-containing A/D converter 101 in the ECU 10 that will be described later.

In FIG. 1, reference numerals 5 and 6 denote crank angle sensors disposed near the cranks haft (not shown) of the engine 1. The crank angle sensor 5 generates a pulse signal for detecting a reference position at, for example, every 720° of the crank angle, and the crank angle sensor 6 generates a pulse signal for detecting a crank angle at every 30° of the crank angle. The pulse signals of these crank angle sensors 5 and 6 are fed to an input/output interface 102 of the ECU 10, wherein the output of the crank angle sensor 6 is supplied to an interrupt terminal of a CPU 103 in the ECU 10 The ECU 10 calculates the number of revolutions (rotational speed) of the engine 1 based on an interval between the crank angle pulse signals from the crank angle sensor 6 to use it for executing various controls.

In this embodiment, further, the engine 1 is provided with a variable valve timing mechanism 50. The variable valve timing mechanism 50 in this embodiment works to continuously vary the rotational phase of the cam shaft (not shown) that drives the engine intake valve with respect to the crank shaft while the engine is in operation. A variety of types of the variable valve timing mechanisms 50 can generally be used. In this embodiment, however, there is no particular limitation on the type of the variable valve timing mechanism that is used, and the variable valve timing mechanism of any known type can be used provided it is capable of continuously varying the valve timing. In this embodiment, further, the valve timing of the intake valve only is varied. The invention, however, can be applied to either the engine equipped with a variable valve timing mechanism which varies the valve timings of both the intake valve and the exhaust valve or the engine equipped with a variable valve timing mechanism which varies the valve timing of the exhaust valve only.

In the drawing, reference numeral 51 denotes a cam rotational angle sensor which is disposed near the cam shaft of the engine 1 to generate a reference cam rotational pulse signal every time when the cam shaft arrives at the reference rotational position. The reference cam rotational pulse signal is supplied to an input/output interface 102 in the ECU 10. The ECU 10 calculates the present valve timing VT of the intake valve based on a phase difference between a reference cam rotational pulse signal input from the cam rotational angle sensor 51 and a reference rotational pulse signal of the crank shaft input from the crank angle sensor 5.

The electronic control unit (ECU) 10 of the engine 1 is constituted as, for example, a microcomputer, and includes the multiplexer-containing A/D converter 101, the input/output interface 102, the CPU 103, as well as a ROM 104, a RAM 105, a backup RAM 106 capable of maintaining the memory even when the main switch is turned off, and a clock-generating circuit 107.

As will be described later, the ECU 10 executes basic controls of the engine 1, such as controlling the fuel injection amount based on the intake air amount of the engine, controlling the ignition timing, and controlling the engine valve timings depending upon the operating conditions. In this embodiment, ECU 10 further executes control operations such as for estimating the amount of the air taken in by the engine based on the estimated throttle valve opening degree as explained later.

To execute the above control operations, the ECU 10 receives an engine intake air amount (KL) signal from the air flow meter 3, a throttle opening (TA) signal from the throttle opening sensor 17, and a cooling water temperature (TW) signal from the water temperature sensor 9 after having subjecting them to the A/D conversion according to an A/D conversion routine executed at regular time intervals.

The input/output interface 102 of the ECU 10 is connected to the fuel injection valve 7 through a drive circuit 108 to control the amount of fuel injection from the fuel injection valve 7 and the injection timing, and is further connected to spark plugs 111 of the engine 1 through an ignition circuit 110 to control the ignition timings of the engine. Further, the input/output interface 102 of the ECU 10 is connected to the actuator 16a of the throttle valve 16 and to the actuator (not shown) of the variable valve timing mechanism 50 through drive circuits 113 and 115, in order to control the opening degree of the throttle valve 16 and the valve timing of the intake valve.

Next, described below is how to calculate the amount of fuel injection for the engine according to the embodiment.

In this embodiment, the fuel injection amount (injection time of each fuel injection valve) TAU is calculated based on the amount of the air taken in by each cylinder and the engine rotational speed in compliance with the following formula, $$TAU = (KL/NE) \times KINJ \times \alpha \times FAF \quad (1)$$

where KL is the amount of the air (flow rate) taken in by the engine, and NE is the engine rotational speed.

In this embodiment, as will be described later, KL is an estimated amount of the air taken in by the engine when the intake valve of the cylinder closes. Further, KINJ is a conversion constant for calculating the amount of fuel for bringing the engine air-fuel ratio to the target air-fuel ratio (e.g., stoichiometric air-fuel ratio). That is, $(KL/NE) \times KINJ$ represents a basic amount of fuel injection necessary for bringing the combustion air-fuel ratio in each cylinder to the target air-fuel ratio when the engine intake air amount is KL and the rotational speed is NE. Further, $\alpha$ is a correction coefficient determined from the warm-up state of the engine or from other operating conditions, and FAF is an air-fuel ratio correction coefficient. The air-fuel ratio correction coefficient FAF is a correction coefficient for feedback-controlling the fuel injection amount based on the outputs of the air-fuel ratio sensors 13 and 15 disposed in the exhaust passage, so that the engine exhaust gas air-fuel ratio (i.e., combustion air-fuel ratio of the engine) becomes the target air-fuel ratio. According to this embodiment, the air-fuel ratio feedback control may be of any known type provided it is capable of controlling the air-fuel ratio to be the target air-fuel ratio, and is not described here in detail.

In this embodiment, as will be understood from the above formula (1), the fuel injection amount TAU of the engine is calculated by, first, calculating the basic fuel injection amount (KL/NE)×KINJ based on the amount of the air taken in by the engine and the engine rotational speed, and by correcting the basic fuel injection amount based on the operating condition (α) of the engine of during the warm-up operation and the air-fuel ratio feedback correction coefficient FAF.

Next, described below is the method of calculating the amount KL of the air taken in by the engine according to the embodiment. When an ordinary engine is in steady operation (i.e., the engine rotational speed NE and the throttle valve opening degree TA are maintained constant), the amount of the air taken in by the engine becomes a function of the throttle valve opening degree TA and the engine rotational speed NE, and is exclusively determined if the throttle valve opening degree TA and the engine rotational speed NE are determined.

In this embodiment, the amounts KL of the air taken in by the engine are measured in advance under the conditions of combinations of the engine rotational speed NE and the throttle valve opening degree TA by using an actual engine which is in steady operation, and the values of the amounts KL of the air taken in are stored in a ROM 104 of the ECU 10 in the form of a numerical map using TA and NE. When the engine is in operation, the ECU 10 calculates the amount of the air taken in by the engine from the map when the engine is in steady operation by using the throttle valve opening degree TA detected by the throttle opening sensor 17 and the engine rotational speed NE. The amount of the air given by the map of TA and NE is a value when the engine is steadily operated in the standard state, and may often be different from the amount of the air actually detected by the air flow meter 3. In the following description, therefore, the measured value of the amount of the air taken in (value detected by the air flow meter 3) is denoted by KLSM, and the value of the amount of the air taken in stored in the map as a function of TA and NE is denoted by KLTA to distinguish them from each other.

As described before, the amount of the air actually taken in by the cylinder is fixed at a moment when the intake valve of the cylinder is closed. In the actual operation, too, the amount of the air (flow rate) taken in by the cylinder at a moment when the intake valve is closed, is most precisely corresponding to the amount of the air taken in by the cylinder. In order to supply the fuel into the cylinder, however, the fuel must be injected from the fuel injection valve 7 while the intake valve is being opened, and the amount KL of the air taken in must be calculated before the intake valve closes. In this embodiment, therefore, the amount of the air taken in when the intake valve closes is estimated (hereinafter, the estimated amount of the air taken in when the intake valve closes is called KLFWD) by using the values KLTA and KLSM at the fuel injection timing (when the intake valve is being opened), and the fuel injection amount TAU is calculated based on the estimated value KLFWD.

Described below is a method how to calculate the value KLFWD.

The value of the amount KLTA of the air taken in during the steady operation read out from the map by using TA and NE, immediately changes if the throttle valve opening degree TA or the engine rotational speed NE changes. However, the actual amount KL of the air taken in does not immediately changes to the value KLTA corresponding changed values of TA and NE. Instead, the actual amount KL changes after a certain delay time.

FIG. 2 is a diagram illustrating a change in the actual amount KL of the air taken in when the map value KLTA of the amount of the air taken in has changed stepwise due to changes in the TA and NE. When KLTA changes stepwise as shown in FIG. 2, KL changes relatively slowly and arrives at KLTA that has changed after the passage of a given period of time. The behavior of KL can be approximated by a first-order delay response relative to the change in KLTA. Accordingly, the present amount of the air taken in can be calculated from the past amount of the air taken in and the present value of KLTA by using the first-order delay response model. That is, if the present amount of the air taken in (calculated value), is denoted by KLCRT, then, KLCRT can be expressed by using the following first-order delay response formula, $$KLCRT = KLCRT_{i-1} + (KLTA - KLCRT_{i-1}) \times (1/N) \quad (2)$$

where KLCRT is the present amount of the air taken in (calculated value), $KLCRT_{i-1}$ is the amount of the air taken in a time Δt before the present time, and KLTA is the amount of the air taken in (map value) in a steady state operation determined from the present throttle valve opening degree TA and the engine rotational speed NE.

Further, N is a weighing coefficient and is expressed as N=T/Δt by using a time constant T of first-order delay response and the time Δt. The time constant T is determined by the throttle valve opening degree TA and the engine rotational speed NE, and is determined in advance as a function of TA and NE by experiment by using an actual engine.

In this embodiment, calculation in compliance with the above formula (2) is commenced at the start of the engine by using an initial value of KLCRT=KLTA. Thereafter, calculation of the formula (2) is repeated after every time period Δt while the engine is in operation in order to calculate the present amount KLCRT of the air taken in as a result of sequential calculation from the start of the engine. As will be obvious from the formula (2), when the engine steadily operates (i.e., operates in a state where KLTA remains constant) for some period of time, the value of KLCRT comes into agreement with KLTA.

Although the value KLCRT calculated above represents the present amount of the air taken in, the value most precisely reflecting the amount of the air actually taken in by the cylinder is the amount of the air taken in by each cylinder when the intake valve closes. In order to precisely calculate the amount KL of the air taken in, therefore, it is desired to conduct the calculation by using the amount of the air taken in when the intake valve is closed. On the other hand, the present amount KLCRT of the air taken in is calculated by approximating the response in the amount of the air taken in by the first-order delay response system as shown in FIG. 2. Therefore, if it is presumed that the present amount KLCRT of the air taken in is maintained constant after KLTA has changed and, then, the amount of the air taken in at a moment later than the present (the moment when KLCRT is calculated) can be estimated by successively repeating the calculation of the formula (2) by using the same first-order delay response model. That is, after KLCRT is calculated, the amount of the air taken in after the time Δt lapsed from the present can be calculated by executing the formula (2) one time using the same value KLTA, If the calculation of the formula (2) is repeated twice, the amount of the air taken in after the passage of 2×Δt can be calculated. In other words, if the time from the present moment (the moment when KLCRT is calculated) until when the intake valve of any cylinder closes next, is denoted by L, then, it is possible to calculate the amount of the air taken in at the time when the valve of any cylinder closes next by repeating the calculation of the formula (2) $L/\Delta t$ times using the present KLTA with the present value KLCRT as the initial value. Here, if the calculated amount of the air taken in when the intake valve of any cylinder that is closed is called KLVLV (see FIG. 4), then, KLVLV can be calculated by sequentially repeating, $KLCRT_{i+1}=KLCRT+(KLTA-KLCRT)\times(1/N)$ $KLCRT_{i+2}=KLCRT_{i+1}+(KLTA-KLCRT_{i+})\times(1/N)$

- - - (repeated $P$ times, where $P=L/\Delta t$) - - -

$KLVLV=KLCRT_{i+P}=KLCRT_{i+P-1}+(KLTA-KLCRT_{i+P-1})\times(1/N)$ (3)

The value KLTA used for the above sequential calculation is a map value based on the present TA and NE, Here, however, the value NE does not greatly change within a short period of time. Therefore, the precision of estimation does not drop so much even if the calculation is conducted by using the present rotational speed. However, the value TA may greatly change within a short period of time during the transient operation condition (at the time of quick acceleration or quick deceleration). In order to increase the precision for estimating KLVLV, therefore, if KLVLV is calculated from the present value of KLCRT by the above sequential calculation, it becomes necessary to calculate KLTA based not on the present value TA but on the value of the throttle valve opening degree TA when the intake valve closes In this embodiment, therefore, the throttle valve opening degree TA when the intake valve closes is precisely estimated relying upon the phase-advanced inverse calculation method proposed in the above-mentioned Japanese Unexamined Patent Publication (Kokai) No. 10-169469.

This embodiment uses the electronically controlled throttle valve which is equipped with an independent actuator 16a but is not mechanically coupled to the accelerator pedal. The ECU 10 reads the amount of depression of the accelerator pedal from the accelerator opening sensor (not shown) disposed near the accelerator pedal at a predetermined timing, determines a target throttle valve opening degree based on the amount of the depression of the accelerator pedal, and drives the actuator 16a so that the opening degree of the throttle valve 16 is controlled to the target opening degree. In this embodiment, ECU 10 calculates the target opening degree TAG of the throttle valve based on the present accelerator opening degree and, after holding the calculated target opening degree for a predetermined delay time D, outputs the target opening degree TAG to the actuator 16a after the delay time TAG has lapsed, That is, the actual movement of the throttle valve is delayed by the time D with respect to the operation of the accelerator pedal.

Described below is the reason for delaying the operation of the throttle valve by the time D FIG. 3(A) is a diagram illustrating a relationship between the target throttle valve opening degree TAG and the change in the actual throttle valve opening degree. Even when the driver quickly changes the amount of depression of the accelerator pedal (accelerator opening degree), the target throttle valve opening degree TAG changes almost simultaneously with the change in the accelerator opening degree. However, the actual throttle valve opening degree is delayed, in changing, by a predetermined amount behind the target opening degree TAG due to a delay in the operation of the actuator 16a and due to a delay in the control operation. That is, even when the target opening degree TAG has quickly changed as indicated by a solid line in FIG. 3(A), the actual throttle valve opening degree TA changes as nearly approximated by a first-order delay behind the change in the TAG as represented by a dotted line. The characteristics of the throttle valve actuation are known in this case. Therefore, assuming that the target opening degree has changed stepwise at a moment $t_0$ as shown in FIG. 3(A), the actual throttle valve opening degree after the time L has lapsed from the present can be precisely estimated by the first-order delay approximation. However, the target opening degree TAG does not actually change stepwise but changes even after the moment $t_0$. Therefore, if the throttle valve opening degree after the passage of the time L is estimated based on the target opening degree TAG at the moment $t_0$, then, a change in the target opening degree TAG until the passage of the time L is not reflected on the estimation. When the target opening degree TAG rapidly changes and, thereby, a problem of a large drop in the precision for estimating the throttle valve opening degree occurs.

In this embodiment, therefore, the operation of the throttle valve is intentionally delayed by the time D to increase the precision for estimating the throttle valve opening degree. FIG. 3(B) is a diagram illustrating a case where the operation of the throttle valve is delayed by the time D relative to FIG. 3(A). Assuming that the accelerator opening degree AC starts changing at a moment $t_i$, a target opening degree TAG corresponding to a change in the accelerator opening degree AC is input to the actuator of the throttle valve, and the throttle valve starts opening at a moment ($t_0$ in FIG. 3(B)) after the time D has passed from the moment $t_i$. At the moment $t_0$, the target opening degree Tag after the moment $t_i$ till the moment $t_0$ has been set already and has been known. Namely, if considered based on the time $t_0$, this means that a change in the target opening degree TAG from the moment $t_0$ toward the future by the time D (till the moment $t_1$ in FIG. 3(B) has been known at the moment to Therefore, the throttle valve opening degree from the moment $t_0$ till the moment $t_1$ can be precisely estimated based on the operation characteristics of the throttle valve and on the change in the target opening degree TAG. Therefore, if the timing at which the valve of a given cylinder closes lies within the time D from the moment $t_0$ (i.e., earlier than the moment $t_1$ in FIG. 3(B)), the throttle valve opening degree at a moment when the valve closes in the cylinder can be estimated with a nearly perfect precision. When the timing at which the valve of the cylinder closes is later than the moment $t_1$, the calculation same as the one used for the above-mentioned KLCRT is repeated from the moment $t_1$, in order to very highly precisely estimate the throttle valve opening degree when the intake valve closes.

The delay time is set to be so short (e.g., about 50 to about 100 milliseconds) that a delay in the operation of the throttle valve cannot be noticed by the driver. Therefore, a delay in the operation of the throttle valve does not cause any problems from the standpoint of operation.

In this embodiment, the throttle valve opening degree TA at a moment when the intake valve of a next cylinder closes is precisely estimated, and the amount KLVLV of the air taken in when the intake valve closes is measured by executing the calculation of the above-mentioned formula (3) by using KLTA that is calculated from the above estimated value and the present rotational speed by using the map.

FIG. 4 is a diagram illustrating a relationship among the amounts of the air taken in. In this embodiment as will be understood from FIG. 4, the amount KLVLV of the air taken in when the intake valve closes is calculated based on the throttle valve opening degree TAVLV of when the intake valve closes, the present engine rotational speed NE, and the calculated amount of the present KLCRT of the air taken.

As described above, the value KLVLV is based on the present amount KLCRT of the air taken in that is successively calculated from the start of the engine, and may contain error accompanying the successive calculation of KLCRT.

In this embodiment, therefore, the precision for estimating the amount of the air taken in is improved by correcting a steady deviation contained in the value KLVLV by using the actual amount of the air taken in measured by the air flow meter 3.

Figure 5:
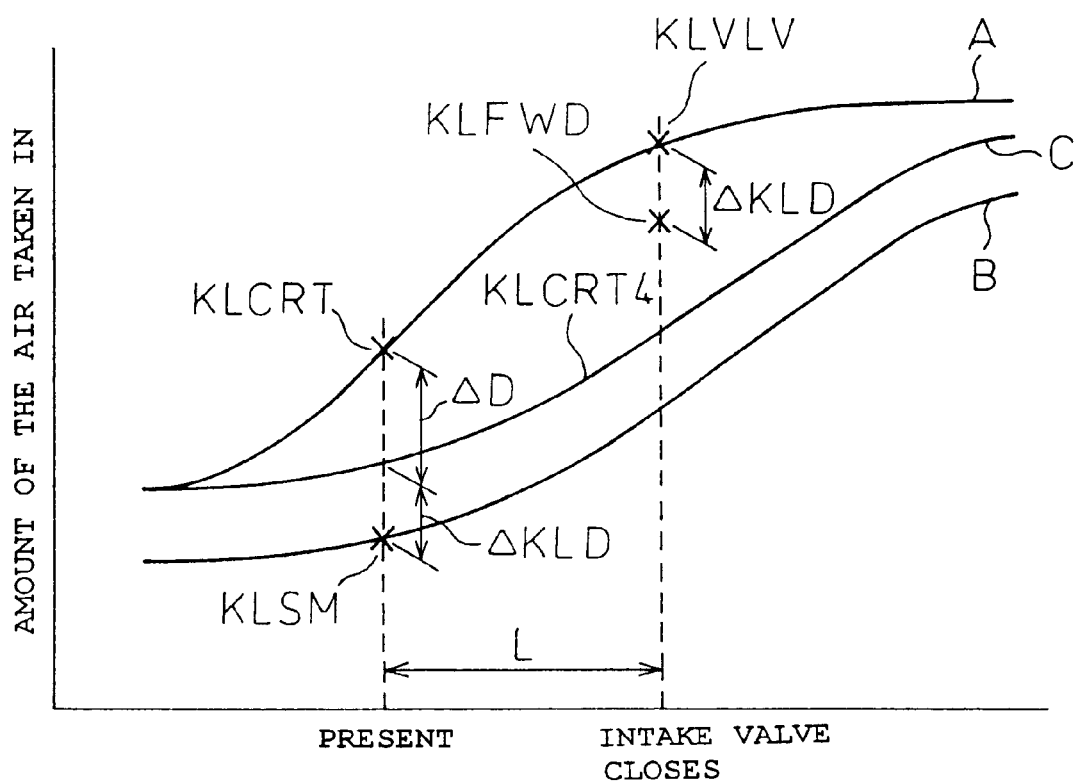

FIG. 5 is a diagram illustrating the principle of correcting the steady deviation. In FIG. 5, the abscissa represents the time and the ordinate represents the amount of the air taken in. A curve A represents a change in the amount KLCRT of the air taken in, and a curve B represents a change in the amount KLSM of the air actually taken in as measured by the air flow meter 3 with the passage of time. The output of the air flow meter 3 is smoothed so as to undergo a change of the first-order delay, like the one shown in FIG. 2, in contrast with the actual change in the amount of the air taken in, to remove fine fluctuating components in the amount of the air actually taken in. Therefore, there occurs a difference including not only the steady deviation but also the above-mentioned delay of response between the amount KLCRT of the air taken in that is calculated and the measured value (output of the air flow meter).

In FIG. 5, further, a curve C represents a first-order delay response which corresponds to the delay in the air flow meter output response relative to the curve A (hereinafter, the calculated amount of the air taken in corresponding to the delay in the air flow meter output response is called KLCRT4). That is, a difference (ΔD in FIG. 4) between the curve A and the curve C (KLCRT4) represents a delay in the air flow meter output response. Therefore, if the calculated amount KLCRT of the air taken in does not contain a steady difference, the output of the air flow meter 3 changes as represented by the curve C (KLCRT4) in FIG. 5 and, hence, a difference (ΔKLD in FIG. 5) between the curve C and the curve B (actual output KLSM of the air flow meter 3) represents a steady deviation contained in the calculated amount KLCRT of the air taken in.

Further, the curve C (KLCRT4,) in FIG. 5 represents first-order delay characteristics with respect to the curve A (KLCRT) and can, hence, be obtained by repeating a calculation the same as that of the above-mentioned formula (2).

The steady deviation ΔKLD contained in KLCRT is expressed as ΔKLD=KLCRT4−KLSM (FIG. 5). The steady deviation ΔKLD is a nearly constant value. Therefore, the value KLVLV obtained by correcting the deviation is expressed, i.e., the estimated amount KLFWD of the air taken in when the intake valve closes used for calculating the amount of the air taken in, is expressed as, $$KLFWD=KLVLV-\Delta KLD=KLVLV-KLCRT4+KLSM \quad (4)$$

In this embodiment, the amount of fuel injection is calculated by using the value KLFWD that is calculated as described above.

In the variable valve timing engine, the value KLTA used for calculating KLFWD varies depending not only upon TA and NE but also upon the engine valve timing. Usually, the engine valve timing VT is determined based upon the amount KLSM of the air taken in actually measured by the air flow meter 3 and upon the engine rotational speed NE. Therefore, even when TA and NE remain the same, the value KLTA varies as VT varies. As described before, on the other hand, the valve timing VT is determined based upon the engine rotational speed NE and the amount KLSM of the air actually taken in and, hence, varies as the amount of the air actually taken in varies. Therefore, there occurs a difference between the estimated value KLFWD calculated above and the amount of the air actually taken in when the intake valve closes except when a change in VT is negligibly small and this causes a problem of a decrease in the precision for estimating KLFWD.

In a first embodiment described below, therefore, the valve timing VT is set based on the throttle valve opening degree TA without using the amount of the air taken in by the engine, which is subject to change depending upon the value VT, in determining the engine valve timing VT.

1. First Embodiment

In this embodiment, the actual throttle valve opening degree when the intake valve closes in a cylinder of which the intake valve is to be closed next, is estimated relying upon the above-mentioned method, and the actual engine valve timing when the intake valve closes is estimated relying upon the above estimated throttle valve opening degree and the operation characteristics of the variable valve timing device 50. Then, the amount KLFWD of the air taken in by the engine when the intake valve of the cylinder closes is estimated by using the throttle valve opening degree estimated when the intake valve closes, estimated valve timing and present rotational speed of the engine.

Described below is a procedure for estimating KLFWD.

FIG. 6 is a flowchart illustrating a procedure for estimating the amount of the air taken in when the intake valve closes. The operation of FIG. 6 is executed every time when the amount of fuel injection for the cylinder is calculated by the ECU 10.

(1) As the operation starts, the ECU 10, first, calculates at step 601 the time Tv (milliseconds) from the present until the intake valve closes in a cylinder in which the intake valve is to be closed next based on the present engine rotational speed and the crank rotational angle.

(2) Next, at step 603, the actual throttle valve opening degree is estimated at each moment in the period from the present until the time D elapses based upon the present throttle valve opening degree $TA_0$ detected by the throttle valve opening sensor 17 and upon a target throttle valve opening degree TAG in the period from a moment the time D before the present to the present. The throttle valve operation characteristics can be approximated by the first-order response delay. Therefore, a change in the actual throttle valve opening degree TA relative to the change in the target throttle valve opening degree TAG can be expressed by the following formula like the above-mentioned formula (2), $$TA_i=TA_0+(TAG_i-TA_0)\times(1/NT)$$

$$TA_{i+1}=TA_i+(TAG_{i+1}-TA_i)\times(1/NT)$$

- - - (repeated $D/\Delta t$ times) - - -

$$TA_D=TA_{D-1}+(TAG_D-TA_{D-1})\times(1/NT) \quad (5)$$

where subscripts i, i+1, - - - , D−1 and D represent values at each moment in the period from the present to the moment time D elapses at an interval of Δt, and NT is a weighing coefficient determined by the operation characteristics of the throttle valve 16 and is determined through experiment.

In this embodiment, the ECU 10 separately executes the operation for reading the accelerator opening degree AC at regular time intervals (for every Δt) to set a target throttle valve,opening degree TAG based on a relationship determined in advance depending upon the value AC, and executes the delaying operation for holding the target opening degree for a preset period of time D and for sending it to the actuator 16a of the throttle valve. At the present moment, therefore, the target opening degrees $TAG_i$ input to the throttle valve actuator at each moment in the period from the present to the moment at which the time D elapses, have all been determined and known. By using these known values, therefore, the values $TAG_i$, $TAG_{i+1}$, - - - , $TAG_{D-1}$, $TAG_D$ can be calculated in compliance with the above formula (5). Therefore, the throttle valve opening degree $TA_i$ is precisely calculated at each moment from the present until the time D elapses.

(3) At step 605, it is judged whether the time Tv until the valve closes calculated at step 601 lies somewhere between now and the time D. When it lies somewhere before the time D, i.e., when D≧Tv, the throttle valve opening degree $TA_i$ at a moment corresponding to the elapse of the time Tv from now is set out of the throttle valve opening degrees $TA_i$ at each of the moments calculated at step 603 as the estimated throttle valve opening degree TAv of when the valve is closed.

When D<Tv, on the other hand, the above formula (5) is further repeated until the intake valve closes (until Tv elapses) to estimate the throttle valve opening, degree TAv of when the intake valve closes. In this case, the target throttle valve opening degree TAG after the elapse of the time D is not known at the present moment. Therefore, the following value estimated by the linear extrapolation is used as the target throttle valve opening degree after the elapse of the period D.

$$TAG_{D+1}=TAG_D+(TAG_D-TAG_{D-1})$$

$$TAG_{D+2}=TAG_{D+1}+(TAG_D-TAG_{D-1})$$

$$TAG_{D+3}=TAG_{D+2}+(TAG_D-TAG_{D-1})$$

- - -

- - -

$$TAG_v=TAG_{v-1}+(TAG_D-TAG_{D-1}) \quad (6)$$

When the time $T_v$ until the intake valve closes is longer than the time D, the throttle valve opening degree of when the intake valve closes is estimate by repeating the calculation of the formula (5) from the elapse of the time D until the elapse of $T_v$ by using the target throttle valve opening degree $TAG_i$ which is estimated as described above during the period of after the passage of the time D until $T_v$ elapses.

(4) At step 607, a target value VTG of the engine valve timing VT of when the intake valve closes is estimated based on the estimated throttle valve opening degree $TA_v$ of when the intake valve closes calculated at step 605 and on the present engine rotational speed NE.

The target value VTG of the engine valve timing has heretofore been set based upon the amount of the air taken in per a revolution of the engine 1 and the engine rotational speed. However, the amount of the air taken in varies depending even upon the valve timing VT. According to the conventional method of setting the valve timing, therefore, the valve timing VT is not determined unless the amount of the air taken in is determined. Therefore, it is not acceptable to use the conventional method of setting the valve timing in the embodiment of the invention, in which the effect of the valve timing is taken into consideration, in estimating the amount of the lair taken in when the intake valve closes. In this embodiment, therefore, the target value of the valve timing VT is set by using the throttle valve opening degree TA instead of the amount of the air taken in. That is, in this embodiment, optimum valve timings VT are found in advance through experiment while changing the combination of the engine rotational speed NE and the throttle valve opening degree TA. The optimum valve timings VT are stored in the ROM 104 in the ECU 10 in the form of a two-dimensional numeric map by using NE and TA, and a target valve timing VTG is set from the numeric map based on the actual values NE and TA when the engine is in operation.

In this embodiment, the actual valve timing VT of when the intake valve closes is estimated by using the numeric map of the target valve timings VTG.

That is, when a change in the engine rotational speed NE of from now to when the intake valve closes is negligibly small, the target valve timing VTG, of when the intake valve closes can be found from the above map by using the present engine rotational speed NE and the estimated throttle valve opening degree TAv of when the intake valve closes. In practice, however, the variable valve timing mechanism 50 involves a delay in the response in the operation, and a actual change in the valve timing VT is delayed from the change in the target valve timing VTG. The operation delay characteristics of the actual variable valve timing mechanism can be approximated by the first-order delay response.

In this embodiment, therefore, the actual valve timing VT of when the intake valve closes is found by repeating the same calculation as the above-mentioned formula (2), $$VT_i=VT_0+(VTG_v-VT_0)\times(1/NV)$$

$$VT_{i+1}=VT_i+(VTG_v-VT_i)\times(1/NV)$$

- - - (repeated $T_v/\Delta t$ times) - - -

$$VT_v=VT_{v-1}+(VTG_v-VT_{v-1})\times(1/NV) \quad (7)$$

where $VT_v$ is an estimated valve timing VT of when the intake valve closes, and $VTG_v$ is a target valve timing determined from the map of target valve timings based on the estimated throttle valve opening degree $TA_v$ calculated at step 605 and the present engine rotational speed NE (i.e., estimated target valve timing of when the intake valve closes). In the above formula, further, NV is a weighing coefficient determined from the operation characteristics of the variable valve timing mechanism, and is determined through experiment. Upon repeating the calculation of the formula (7), therefore, it is made possible at the present time to precisely estimate the valve timing of when the intake valve closes after the elapse of the time $T_v$.

In this embodiment, the target engine valve timing VTG is determined by the engine rotational speed NE and by the throttle valve opening degree VA only. In practice, however, even when the throttle valve opening degree TA, engine rotational speed NE and valve timing VT remain the same, the amount of the air taken in by the engine varies as the atmospheric pressure (altitude) changes. Therefore, in order to make the amount of the air taken in by the engine always becomes the same value when the throttle valve opening degree TA and the engine rotational speed NE remain the same, the valve timing VT must be corrected depending upon the atmospheric pressure (altitude). In this embodiment, the maps of the target valve timings VTG are prepared based on the above-mentioned NE and TA under various atmospheric pressures in advance, and a map of target valve timings VTG corresponding the atmospheric pressure actually measured or calculated during the engine operation is used. Even when the atmospheric pressure changes, therefore, the amount of the air taken in by the engine is precisely calculated.

(5) Next, at step 609 in FIG. 6, the amount KLFWD of the air taken in when the intake valve closes is calculated by using the estimated throttle valve opening degree $TA_v$ of when the intake valve closes and the present engine rotational speed NE. The amount KLFWD is calculated in compliance with the above-mentioned formulas (2) to (4) by using the estimated throttle valve opening degree $TA_v$ of when the intake valve closes.

It is thus made possible to precisely estimate the amount of the air taken in by the engine when the intake valve closes in calculating the amount of fuel injection for each of the cylinders, and to set the amount of fuel injection that meets the engine operating conditions.

(6) The engine ignition timing is calculated at step 611 in FIG. 6. The optimum ignition timing of the engine varies depending upon the engine rotational speed NE, amount (load) KL of the air taken in and valve timing VT. In the conventional variable valve timing engine, it was difficult to precisely estimate the amount of the air taken in when the intake valve closes and the valve timing. During the transient operation, therefore, the ignition timing was often deviated from the optimum value and this results in the deteriorated combustion. In this embodiment, on the other hand, the valve timing $VT_v$ and the amount KLFWD of the air taken in when the intake valve closes, can be precisely estimated at steps 607 and 609. In this embodiment, therefore, the ignition timing which precisely corresponds to the actual operating condition is set by using the amount KLFWD of the air taken in estimated above, the valve timing $VT_v$ and the present engine rotational speed NE. Even during the transient operating condition, therefore, the ignition timing is not deviated from the optimum value, and the combustion is prevented from being deteriorated during the transient operation.

Next, described below is another embodiment of the present invention.

In the above-mentioned embodiment, the operation of the throttle valve is delayed by the time D in order to precisely estimate the throttle valve opening degree of when the intake valve closes by the phase-advanced inverse calculation. Usually, the delay time D is set in such a manner the intake valve of the cylinder to be closed before the time D elapses from a moment the amount of fuel injection is calculated in a normal speed range of the engine, in order to improve the precision for estimating the throttle valve opening degree. When the delay time is set to be constant, however, there occurs a change in the crank rotational position at where the throttle valve starts operating in response to a change when the target throttle valve opening degree is changed. When the crank angle where the throttle valve starts operating varies, i.e., when the crank rotational position (rotational angle) where the amount of the air taken in starts changing varies, the position on the stroke cycle of each cylinder where the amount of the air taken in starts changing also varies. Therefore, the amount of the air actually taken in by the engine is slightly affected by a change in the throttle valve opening degree. In particular, when the target throttle valve opening degree greatly changes due to a shift from the steady operation to the transient operation, dispersion may often appear in the measurement of the amount of the air taken in if a change in the amount of the air taken in occurs at different positions of the stroke cycle in the cylinder. The effect becomes significant particularly when the rotational speed is low such as during the idling operation of the engine. In the embodiments described below, therefore, the precision for estimating the amount of the air taken in is improved by causing the throttle valve to start operating at a particular timing of a particular cylinder when the target throttle valve opening degree changes such as when the steady operation is shifted into the transient operation.

Described below is changing the timing at which the throttle valve starts operating according to the embodiments. In a state where the change in the target throttle valve opening degree is small, such as under the idling operation condition or the steady operation condition, the ECU 10 holds the target throttle valve opening degree calculated based on the amount of the accelerator pedal operation for a predetermined delay time D and sends it to the actuator of the throttle valve after the delay time D has passed as explained in the first embodiment.

However, when the target throttle valve opening degree sharply changes such as when the steady operation is shifted to the transient operation, the ECU 10 changes the time for holding the calculated target opening degree, and so changes the delay time that the throttle valve starts opening at a particular timing on a stroke cycle of a particular cylinder (e.g., a first cylinder).

That is, when the target throttle valve opening degree calculated this time is changing by more than a predetermined amount as compared to the value calculated the previous time, the ECU 10 judges whether the moment of this time is for changing the target throttle valve opening degree, i.e., whether the steady operation was continued up to the previous time by changing the target opening degree a little. When the moment of this time is for changing the target opening degree, i.e., for starting the transient operation, the ECU 10, then, calculates the time $T_R$ until the stroke cycle of the particular cylinder arrives at a particular timing next based on the engine rotational speed and the crank angle, and changes the time (delay time) for holding the target opening degree calculated this time into $T_R$. Then, the target opening degree, right after it has changed is sent to the actuator of the throttle valve when the stroke cycle of the particular cylinder has arrived at a particular timing, so that the throttle valve starts opening from the particular timing. Here, the delay time is changed such that the throttle valve starts operating at the particular timing of the particular cylinder only one time right after the target rotational speed has changed. Thereafter, the delay time is set to a constant value D.

Described below is an embodiment for selecting a particular timing on the stroke cycle of the particular cylinder for which the throttle valve starts operating

2. Second Embodiment

In the second embodiment of the invention, the timing at which the throttle valve starts operating, when the target throttle valve opening degree has changed is set by taking the delay of response in the intake system into consideration, so that the intake air that has passed through the throttle valve arrives at a particular cylinder when the intake valve of the particular cylinder (e.g., first cylinder) is lifted up to its maximum degree and when the throttle valve opening degree has changed.

In a multi-cylinder engine, in general, there exists a period in which the intake valve open periods of two or more cylinders are overlapping. In such a period, the air is taken in by two or more cylinders, and the amount of the air taken in as measured by the air flow meter may temporarily increase. In this period, therefore, the amount of the air filled in the cylinder may not necessarily, correspond to the amount of the air taken in as measured by the air flow meter. Therefore, the precision of estimation may decrease if the above-mentioned amount of the intake air is estimated during the period in which the intake valve opening periods of a plurality of cylinders are overlapping during the transient operation.

In the multi-cylinder engine, on the other hand, when the intake valve is lifted up to a maximum degree in a cylinder, the intake valves of the other cylinders are nearly fully closed. At this period, therefore, if the intake air at a moment when the throttle valve opening degree has started to change is permitted to arrive at the cylinder, interference with the intake air of other cylinders is avoided, and the amount of the intake air measured by the air flow meter comes into precise agreement with the amount of the air actually filled in the cylinder. In this embodiment, therefore, the timing at which the throttle valve starts operating is so set that the intake air that has passed through the throttle valve at the start of operation of the throttle valve arrives at the particular cylinder when the intake valve of that particular cylinder is lifted up to a maximum degree by taking into consideration the delay of response in the intake system (i.e., time until the intake air that has passed through the throttle valve arrives at the particular cylinder).

That is, after having calculated the target throttle valve opening degree based on the amount of accelerator pedal operation, the ECU 10 judges whether the transient operation such as acceleration or the like has started based on the target opening degree that is calculated. When, for example, the target opening degree calculated this time is deviated by more than a predetermined amount from the target opening degree calculated in the previous time, it can be so judged that the transient operation has started. When it is judged that the transient operation has started, the ECU 10, then, judges whether the present target throttle valve opening degree is first accomplished after the start of the transient operation. For example, when there is no change in the target opening degree up to the previous time but the target opening degree is changing this time by more than a predetermined value, it can be so judged that the target opening degree calculated this time is the first one after the start of the transient operation.

When the target opening degree calculated this time is the first one after the start of the transient operation, the ECU 10 calculates the time $T_R$ until the intake valve of the particular cylinder is lifted nearly up to its maximum degree based on the engine rotational speed and the present crank angle. The ECU 10, then, calculates the response delay time $t_d$ of the intake system determined from the present amount of the air taken in by the engine (intake flow velocity), and sets the time for holding the target opening degree calculated this time to be $(T_R-t_d)$. Therefore, as $(T_R-t_d)$ elapses from the present, the target opening degree is sent to the throttle valve actuator, and the throttle valve starts operating. The intake air that has passed through the throttle valve, i.e., the intake air corresponding to a moment at which the flow rate starts changing, passes through the throttle valve and arrives at the particular cylinder in which the intake valve is nearly lifted up to its maximum degree after the elapse of time $t_d$. Therefore, nearly the whole amount of the air that has passed through the throttle valve is filled in the particular cylinder, and the amount of the air taken in by the engine as measured by the air flow meter 3 nearly corresponds to the amount of the air filled in the particular cylinder. Thus, it becomes possible to precisely estimate the amount of the air taken in from the start of the transient operation.

In this case, too, the delay time is changed to meet the particular timing of the particular cylinder only one time right after the start of the transient operation. From the next time and on, the delay time is set again to be the constant value D.

3. Third Embodiment

In this embodiment, as in the second embodiment, the timing at which the throttle valve starts operating is so controlled that the intake air that has passed through the throttle valve at the start of operation arrives at the particular cylinder when its intake valve is lifted up to the maximum degree when the steady operation such as idling operation is shifted to the transient operation. In this embodiment, however, when the throttle valve opening degree sharply changes, the throttle valve starts operating at a timing at which the intake valve is lifted up to its maximum degree in a cylinder of which the intake valve is, first, lifted to the maximum degree after the passage of a predetermined period of time without waiting for a timing at which the intake valve is lifted up to the maximum degree in the particular cylinder.

Namely, in the case of a normal acceleration from the idling operation in this embodiment, the timing at which the throttle valve starts operating is in agreement with the particular timing in the particular cylinder. In this case, the delay time from when the target throttle valve opening degree has changed until when the throttle valve starts moving, becomes long or short depending upon a crank phase at a moment when the target throttle valve opening degree has changed. During the normal mild acceleration, this delay time does not affect the operation. In the case of, for example, sharp acceleration, however, an increased delay in the operation of the throttle valve is not desirable. In this embodiment, therefore, when the target throttle valve opening degree has greatly changed due to sharp acceleration or the like, the throttle valve starts operating at a timing at which the intake valve is lifted to its maximum degree in a cylinder of which the intake valve is, first, lifted up to a maximum degree after the passage of a predetermined period of time without waiting for a timing at which the intake valve is lifted to the maximum degree in the particular cylinder. When the operating condition sharply changes, therefore, the throttle valve operates within a short period of time and good response characteristics for the acceleration can be obtained.

Whether the operating condition sharply changes is judged based on the amount of change in the target opening degree. That is, after having calculated the target throttle valve opening degree based on the amount of accelerator pedal operation, the ECU 10 judges whether the target opening degree calculated next has changed from that of the previous time by more than a predetermined amount. When the target opening degree is changing by more than the predetermined amount, it is judged whether the target throttle valve opening degree is reached first this time after the start of the transient operation. The operation up to this point is the same as that of the second embodiment described above. In this embodiment, however, the target opening degree is changing by more than the predetermined amount. When the target opening degree calculated this time is the first one after the start of the transient operation, it is, then, judged whether the amount of change of the target throttle valve opening degree calculated this time from that of the previous time, is larger than a second predetermined value which is larger than the above predetermined value. When the change in the target throttle valve opening degree is smaller than the second predetermined value, the change in the throttle valve opening degree is relatively mild. As in the second embodiment, therefore, the delay time ($T_R$-$t_d$) is set by taking the delay of response in the intake system into consideration, so that the intake air that has passed at the start of the throttle valve operation will arrive at the particular cylinder when the intake valve is lifted up to its maximum degree.

When the amount of change in the target throttle valve opening degree is larger than the second predetermined value, on the other hand, the operating condition greatly changes and the throttle valve must be quickly operated. In this case, therefore, the ECU 10 judges a cylinder in which the intake valve is lifted up to its maximum degree first after the passage of a predetermined period of time (nearly the normal delay time D) based on the engine rotational speed and the present crank angle, calculates the time required for the intake valve of this cylinder being lifted to its maximum degree, and sets this time to be $T_R$. The ECU 10 further calculates the response delay time $T_d$ in the intake system determined from the present amount of the air (intake flow velocity) taken in by the engine, and sets the time for holding the target opening degree calculated this time to be ($T_R$-$t_d$). Therefore, as the time ($T_R$-$t_d$) elapses from now, the target opening degree is output to the throttle valve actuator, and the throttle valve starts operating. The intake air that has passed through the throttle valve, i.e., the intake air corresponding to a moment at which the flow rate starts changing, arrives at the cylinder in which the intake valve is lifted to its maximum degree, first, after the elapse of a predetermined period of time when the intake valve is lifted nearly up to its maximum degree. Therefore, nearly the whole amount of the air that has passed through the throttle valve is filled in the particular cylinder, and the amount of the air taken in by the engine as measured by the air flow meter 3 nearly corresponds to the amount of the air filled in this cylinder. Thus, it becomes possible to precisely estimate the amount of the air taken in from the start of the transient operation without deteriorating the response characteristics against a sharp change in the operating conditions.

4. Fourth Embodiment

In this embodiment, the throttle valve is operated to prevent the engine stalling when a load is suddenly exerted during the idling operation of the engine due to the start of auxiliary equipment such as air conditioner. In the above-mentioned third embodiment, the delay time is shortened in case of a quick acceleration from the steady operation to prevent deterioration in the response characteristics without causing a decrease in the precision for estimating the amount of the air taken in. In preventing an engine stalling during the idling operation, however, a delayed operation of the throttle valve causes the engine to stall or causes the rotational speed to change greatly as the rotational speed of the engine sharply drops. In this embodiment, therefore, when the throttle valve is operated to avoid a stall during the idling operation, driving the throttle valve simultaneously with the change in the target throttle valve opening degree taking precedence over maintaining the precision for estimating the amount of the air taken in. This avoids an engine stall during the idling operation.

In this case, during the normal idling operation, the ECU estimates the amount of the air taken in by executing the phase-advanced inverse calculation based on the delay in the throttle valve operation of the above-mentioned embodiment 2 or 3. Upon detecting the start of the auxiliary equipment during the idling operation or upon detecting that the engine rotational speed dropped to a value lower than the predetermined value, however, the ECU 10 increases the target throttle valve opening degree from the present value by a predetermined amount irrespective of the amount of operation of the accelerator pedal, sets the time (delay time) for holding the target opening degree to 0, and immediately sends the target opening degree to the throttle valve actuator. The throttle valve, then, immediately starts operating, prevents the occurrence of an engine stall caused by a drop in the engine rotational speed.

(5) Fifth Embodiment

In this embodiment, when the steady operation is shifted to the transient operation, the delay time is so set that the throttle valve starts operating at a particular timing of a particular cylinder and, thereby, the intake air that has passed through the throttle valve when it starts changing arrives at the particular cylinder at a timing at which the piston descending speed during the intake stroke of the particular cylinder becomes a maximum.

The moment when the piston descending speed during the intake stroke becomes a maximum is a moment when the flow rate of the air taken in by the cylinder becomes the greatest (air-filling rate becomes the greatest). Therefore, the period near the moment when the piston descending speed becomes the maximum is least affected by the intake strokes of other cylinders. It is, therefore, possible to precisely measure the amount of the air taken in by the engine by excluding interference with the intake by other cylinders by permitting the intake air that has passed through the throttle valve to arrive at the particular cylinder at a moment when the amount of the air taken in starts changing by taking into consideration the delay of response in the intake system like in the above-mentioned embodiments.

6. Sixth Embodiment

In this embodiment, when the steady operation is shifted to the transient operation, the delay time is so set that the throttle valve starts operating at a particular timing of a particular cylinder and, thereby, the intake air that has passed through the throttle valve when it starts changing arrives at the particular cylinder at a moment other than the valve-overlapping period in which both the intake valve and the exhaust valve are opened.

During the valve-overlapping period in which both the intake valve and the exhaust valve are opened, there occurs a blow down of the burnt gas into the intake port; i.e., the burnt gas of a high pressure in the cylinder flows back through the intake valve into the intake port. During this period, therefore, no air is taken in by the cylinder. When the intake air after it has started changing arrives at the particular cylinder during the valve-overlapping period, therefore, the amount of the air taken in by the cylinder does not often precisely correspond to the amount of the air taken in by the engine. In this embodiment, the error due to the blow down of the burnt gas can be eliminated from the measurement of the amount of the air taken in by so permitting the intake air that has passed through the throttle valve when it starts changing its opening degree as to arrive at the particular cylinder at a moment other than the valve-overlapping period of the particular cylinder.

The above-mentioned second, fifth and sixth embodiments have illustrated how to select the timing for driving the throttle valve in the particular cylinder. Upon selecting the timing for driving the throttle valve of the particular cylinder as described above, it becomes possible to eliminate an error from the measured amount of the air taken in. In the above-mentioned embodiments, however, the operation is often slightly affected depending upon which cylinder of the engine is selected as a particular cylinder. The following embodiment explains which cylinder is to be selected as the particular cylinder.

7. Seventh Embodiment

This embodiment selects, as a particular cylinder, the cylinder which does not readily develop knocking during a transient operation. Knocking during the transient operation occurs, due to a delay in retarding the ignition timing compared to the increase in the amount of the air filled in the cylinder. Further, a multi-cylinder engine includes cylinders in which knocking easily occurs and cylinders in which knocking does not easily occur due to the arrangement of the cylinders. In this embodiment, cylinders in which knocking does not easily occur during the transient operation are specified in advance through experiment, and these cylinders are set as the particular cylinders. While being shifted into the transient operation, therefore, the cylinders in which knocking does not easily occur are first filled with the intake air and, thereby, the occurrence of knocking during the transient operation can be eliminated.

8. Eighth Embodiment

This embodiment selects, as a particular cylinder, the cylinder from which the exhaust gas most efficiently hits the upstream air-fuel ratio sensor 13 disposed in the exhaust manifold (FIG. 1). In this embodiment, as described before, the amount of fuel injection is controlled by feedback based upon the exhaust gas air-fuel ratio detected by the air-fuel ratio sensors 13 and 15, so that the engine air-fuel ratio becomes the target air-fuel ratio. The exhaust gases from the cylinders are homogeneously mixed together at a position of the downstream air-fuel ratio sensor 13 downstream of the catalyst 20. At a position of the upstream air-fuel ratio sensor 13 in the exhaust manifold 11, however, the exhaust gas from a given cylinder may be more easily detected by a sensor than the exhaust gases from other cylinders due to the shape of the exhaust manifold 11 or the position where the sensor 13 is mounted. In this case, the output of the sensor 13 becomes most susceptible to a change in the exhaust gas air-fuel ratio from the above given cylinder. In this embodiment, the above given cylinder which most affects the output of the upstream air-fuel ratio sensor 13 is specified in advance through experiment, and this cylinder is selected as a particular cylinder. Thus, the cylinder which most affects the output of the air-fuel ratio sensor is selected as the particular cylinder. Therefore a change in the exhaust gas air-fuel ratio during the transient operation is sensitively reflected on the output of the air-fuel ratio sensor improving the response characteristics of the air-fuel ratio feedback control operation during the transient operation.

9. Ninth Embodiment

This embodiment selects the cylinder which is most easily filled with the intake air as a particular cylinder. In a multi-cylinder engine, the air charging efficiency is dispersing depending upon the cylinders due to the shape of the intake manifold and the arrangement of the cylinders. In this embodiment, the cylinder having the greatest air charging efficiency among the cylinders is selected, i.e., the cylinder which is most easily filled with the intake air is selected as a particular cylinder. Thus, upon selecting the cylinder which is easily filled with the intake air as the particular cylinder, the air is supplied first into the cylinder that can be most easily filled with the intake air at the start of the transient operation and, thereby, the acceleration characteristics during the transient operation such as during acceleration are improved.

10. Tenth Embodiment

This embodiment selects the cylinder having the shortest delay time in the intake response as a particular cylinder. As described earlier, there exists a delay time that corresponds to the time for the intake air to flow from the throttle valve into the cylinder before a change in the throttle valve opening degree appears as a change in the amount of the air flowing into the cylinder when the throttle valve opening degree has changed. This time slightly varies among the cylinders due to the shape of the intake manifold and the arrangement of the cylinders. In this embodiment, the cylinder having the shortest delay time in the intake response is selected as a particular cylinder. By doing so, it becomes possible to fill the cylinder having the quickest response with the air first at the start of the transient operation. Therefore, acceleration characteristics are improved during a transient operation such as during acceleration.

11. Eleventh Embodiment

In the above-mentioned second to tenth embodiments, the throttle valve starts driving at a particular timing on the stroke cycle of the particular cylinder. In the variable valve timing engine, however, the crank angle that creates the above particular timing (e.g., timing at which the intake valve is lifted up to its maximum degree or the valve-overlapping period) varies depending upon a change in the engine valve timing. In this embodiment, therefore, the above particular timing is calculated by taking into consideration a change in the, engine valve timing at the start of the transient operation.

Namely, in this embodiment, the ECU 10 corrects the crank angle that is reached at a particular timing based on the present valve timing, and calculates the time $T_R$ based upon the corrected crank angle, the present crank angle and the engine rotational speed at the time of calculating the time (time $T_R$ in the second and third embodiments) until the particular timing is reached in the particular cylinder. Therefore, the air that has passed through the throttle valve which has started changing precisely arrives at the particular cylinder at a particular timing on the stroke cycle, further improving the precision for measuring the amount of the air taken in.

According to the present invention, as described above, it becomes possible to precisely calculate the amount of the air taken in by the cylinder in estimating the amount of the air taken in by the cylinder by delaying the start of operation of the throttle valve by a predetermined period of time.

What is claimed is:

1. A device for controlling an internal combustion engine which sets a target throttle valve opening degree of the internal combustion engine based on a present amount of accelerator pedal operation and, after a predetermined delay time has passed, starts driving the throttle valve so that the actual throttle valve opening degree becomes said target opening degree, thereby to estimate the actual throttle valve opening degree in the future after a predetermined period of time has passed from the present based on said target opening degree, said delay time and the operation characteristics of the throttle valve, and to calculate the amount of the air that will be taken in by the engine in the future after said predetermined period of time has passed based upon said estimated value, said device for controlling an internal combustion engine comprising:

target valve timing-setting means for setting a target valve timing of the engine based on an actual throttle valve opening degree;

variable valve timing means for controlling the valve timing of the engine to said target valve timing;

valve timing-estimating means for calculating an estimated value of said target valve timing in the future after said predetermined period of time has passed based on said estimated throttle valve opening degree, and for estimating a actual engine valve timing in the future after the passage of said predetermined period of time based on said estimated target valve timing; and intake air amount-estimating means for estimating the amount of the air that will be taken in by the engine in the future after said predetermined period of time has passed based on said estimated throttle valve opening degree and said estimated valve timing.

2. A device for controlling an internal combustion engine according to claim 1, wherein said target valve timing-setting means sets, as a target valve timing, a value obtained by correcting, based on the atmospheric pressure, a valve timing set relying upon said actual throttle valve opening degree.

3. A device for controlling an internal combustion engine according to claim 1, further comprising means for setting an engine ignition timing based upon the estimated amount of the air that will be taken in by the engine in the future after the passage of said predetermined period of time and upon the estimated valve timing.

4. A device for controlling an internal combustion engine which sets a target throttle valve opening degree of the internal combustion engine based on a present amount of accelerator pedal operation and, after a predetermined delay time has passed, starts driving the throttle valve so that the actual throttle valve opening degree becomes said target opening degree, thereby to estimate the actual throttle valve opening degree in the future after a predetermined period of time has passed from the present based on said target opening degree, said delay time and the operation characteristics of the throttle valve, and to calculate the amount of the air that will be taken in by the engine in the future after said predetermined period of time has passed based upon said estimated value, said device for controlling an internal combustion engine comprising:

delay time-setting means for so setting said delay time that said throttle valve starts driving data a predetermined timing in a stroke of a particular cylinder of the engine.

5. A device for controlling an internal combustion engine according to claim 4, wherein said delay time-setting means so sets said delay time that the intake air that has passed through the throttle valve when it has started to drive arrives at said particular cylinder when the intake valve is lifted up to its maximum degree in said particular cylinder.

6. A device for controlling an internal combustion engine according to claim 4, wherein, when the rate of change in said target throttle valve opening degree is greater than a predetermined value, said delay time-setting means so sets said delay time that the intake air that has passed through the throttle valve arrives, first, at a cylinder of which the intake valve is lifted up to its maximum degree after a predetermined period of time has passed when the intake valve of said cylinder is lifted up to its maximum degree irrespective of said predetermined timing.

7. A device for controlling an internal combustion engine which sets a target throttle valve opening degree of the internal combustion engine based on a present amount of accelerator pedal operation and, after a predetermined delay time has passed, starts driving the throttle valve so that the actual throttle valve opening degree becomes said target opening degree, thereby to estimate the actual throttle valve opening degree in the future after a predetermined period of time has passed from the present based on said target opening degree, said delay time and the operation characteristics of the throttle valve, and to calculate the amount of the air that will be taken in by the engine in the future after said predetermined period of time has passed based upon said estimated value, said device for controlling an internal combustion engine comprising:

delay time-setting means for so setting said delay time that said throttle valve starts driving at a predetermined timing in a stroke of a particular cylinder of the engine when the engine is idling;

stall-avoiding means for avoiding an engine stall by setting a target throttle valve opening degree irrespective of the amount of accelerator pedal operation when it is probable that the engine that is idling may stall; and means for starting the drive of the throttle valve so that the throttle valve opening degree reaches said target opening degree immediately when the target throttle valve opening degree is set by said stall-avoiding means to avoid an engine stall irrespective of the delay time set by said delay time-setting means.

\* \* \* \* \*